(12) United States Patent
Gomes et al.

(10) Patent No.: US 8,213,110 B1
(45) Date of Patent: *Jul. 3, 2012

(54) DISK DRIVE SUSPENSION HAVING A COINED BASEPLATE

(75) Inventors: Brian Antony Louis Gomes, Bangalore (IN); Shijin Mei, Murrieta, CA (US)

(73) Assignee: Magnecomp Corporation, Murrieta, CA (US)

( * ) Notice: Subject to any disclaimer, the term of this patent is extended or adjusted under 35 U.S.C. 154(b) by 989 days.

This patent is subject to a terminal disclaimer.

(21) Appl. No.: 11/809,116

(22) Filed: May 31, 2007

Related U.S. Application Data

(63) Continuation of application No. 11/282,450, filed on Nov. 17, 2005, now Pat. No. 7,420,772.

(51) Int. Cl.
*G11B 5/012* (2006.01)

(52) U.S. Cl. .................................. 360/97.11

(58) Field of Classification Search .............. None
See application file for complete search history.

(56) References Cited

U.S. PATENT DOCUMENTS

| | | | |
|---|---|---|---|
| 4,603,567 A | 8/1986 | Smith et al. | |
| 5,297,413 A | 3/1994 | Schones et al. | |
| 5,471,734 A | 12/1995 | Hatch et al. | |
| 5,473,488 A | 12/1995 | Gustafson et al. | |
| 5,588,200 A | 12/1996 | Schudel | |
| 5,636,013 A | 6/1997 | Swift | |
| 5,657,187 A | 8/1997 | Hatch et al. | |
| 5,682,780 A | 11/1997 | Girard | |
| 5,687,597 A | 11/1997 | Girard | |
| 5,712,468 A | 1/1998 | Ace | |
| 5,818,662 A | 10/1998 | Shum | |
| 5,832,763 A | 11/1998 | Girard | |
| 5,898,543 A | 4/1999 | Jagt et al. | |
| 5,943,189 A | 8/1999 | Boutaghou et al. | |
| 5,995,335 A | 11/1999 | Jurgenson et al. | |
| 6,011,239 A | 1/2000 | Singh et al. | |
| 6,046,887 A | 4/2000 | Uozumi et al. | |
| 6,063,508 A | 5/2000 | Hanrahan et al. | |
| 6,072,151 A | 6/2000 | Jurgenson et al. | |
| 6,154,952 A | 12/2000 | Tangren | |
| 6,181,529 B1 * | 1/2001 | Aoyagi et al. | 360/255 |
| 6,198,602 B1 | 3/2001 | Vera et al. | |
| 6,697,228 B1 | 2/2004 | Mei et al. | |
| 6,778,362 B1 | 8/2004 | Davis et al. | |
| 6,956,721 B1 | 10/2005 | Khan | |
| 7,420,772 B1 * | 9/2008 | Mei | 360/244.8 |
| 2002/0108427 A1 | 8/2002 | Matsushita | |
| 2003/0138203 A1 | 7/2003 | Imakado et al. | |
| 2003/0147170 A1 | 8/2003 | Yamagishi et al. | |
| 2003/0154005 A1 | 8/2003 | Wong et al. | |
| 2003/0188563 A1 | 10/2003 | Wong et al. | |
| 2004/0016733 A1 | 1/2004 | Thaveeprungs-riporn | |
| 2005/0030670 A1 | 2/2005 | Ando et al. | |
| 2006/0171079 A1 * | 8/2006 | Tada et al. | 360/255 |

* cited by examiner

*Primary Examiner* — David D Davis
(74) *Attorney, Agent, or Firm* — Intellectual Property Law Offices of Joel Voelzke, APC

(57) ABSTRACT

A baseplate that is configured to be included in a hard disk drive suspension assembly, and a related method for manufacturing the baseplate. The baseplate having a surface that has been coined to reduce any roughness that might have existed in a portion of the surface before the surface was coined.

15 Claims, 15 Drawing Sheets

DISK DRIVE SUSPENSION HAVING A COINED BASEPLATE

CROSS-REFERENCE TO RELATED APPLICATION

This application is a continuation-in-part of U.S. patent application Ser. No. 11/282,450, filed on Nov. 17, 2005, entitled "Integral Anvil for Pre-Loading a Disk Drive Suspension Assembly," by Shijin Mei, which application is incorporated by reference herein. Accordingly, priority is claimed under 35 U.S.C. §120 to U.S. patent application Ser. No. 11/282,450.

BACKGROUND

1. Field of the Invention

The present invention relates generally to suspension systems, also referred to as suspension assemblies, for hard disk drive systems. More specifically, the present invention relates to providing tooling features integral to the suspension system to aid in forming suspension system components, and to coining one or more surfaces of a component that is used as part of the suspension system to remove roughness.

2. Related Art

Suspension systems for suspending read/write heads in hard disk drives are well known in the art. In a typical hard disk drive suspension system, the read/write head is mounted on a slider having an aerodynamic design, such that airflow between the slider and a spinning disk generates lift that allows the head to fly above the disk surface an optimal distance for reading data from the surface or writing data to the surface. The slider is typically bonded to a flexure (or gimbal), which permits the slider to pitch and roll as it tracks fluctuations in the disk surface. The flexure is coupled to a load beam, which is formed from a metal such as stainless steel and configured with a spring portion that applies a loading force, also known as a "pre-load" or "gram force", to counteract the lift. A rigid end of the load beam is coupled to a baseplate, where an actuator is provided for precisely positioning the read/write head through actuation of the load beam.

The spring portion of the load beam is a linear flex-spring, or planar cantilever-type spring, typically formed from a metal sheet. The desired pre-load force is achieved by forming one or more bends in the linear spring portion of the load beam, taking into account the spring constant of the material, its mass, and the expected load. FIG. 1 illustrates a typical suspension assembly 100 consisting of a baseplate 102, springs 104, and load beam 106. In one commonly practiced technique, during manufacture of the assembly 100 springs 104 are preloaded using appropriate forming tools, such as tooling anvil 108 and roller 110. Springs 104 are bonded to the underside of baseplate 102 and load beam 106 to allow for placement of tooling anvil 108 at an optimal bend location 112 beneath the springs. So located, a bendable area 114 of each spring 104 is bent around a corner 140 of tooling anvil 108 under pressure of roller 110 as it pushes downward and rolls away from baseplate 102 in the directions shown by dashed lines. The resulting bend angle radius of spring 104 is therefore influenced by the curvature of corner 140. This curvature will change over time after repeated use of tooling anvil 108. Eventually, tooling anvil 108 will need to be replaced to avoid out-of-tolerance formation of bend angle radius in springs 104.

The main problem with the foregoing technique is that the accuracy of the bend location depends on placement of tooling anvil 108 with respect to assembly 100. Hard disk drive suspension systems typically demand very strict manufacturing tolerances on the order of 1.0 mil; therefore anvil placement requires high precision tooling, which adds to the manufacturing expense.

Another problem with the conventional anvil-and-roller technique is illustrated in FIG. 2, which shows a side view of a typical suspension assembly 200. Assembly 200 essentially consists of the same components as in assembly 100, except that a bridging area 214 of spring 204 has a shorter length relative to the diameter of roller 210. In suspension assemblies having this dimensional constraint, it may be impossible to impact roller 210 at the optimal bend location 212 due to mechanical interference from baseplate 202 or load beam 206. Where springs are bonded to the underside of the assembly, interference occurs as roller 210 encounters baseplate or load beam steps located above the surface of the spring. The example assembly 200 illustrates this interference effect: placement of roller 210 is limited by the step of baseplate 202 such that impact point 216 is displaced from optimal bend location 212 by a horizontal offset Δ. An excessive offset results in formation of the bend in a non-optimal location, or creation of an undesirable secondary bend.

In view of the foregoing, there remains considerable margin for improving pre-loading techniques for disk drive suspension assemblies. Also, surfaces of the baseplate 102 and 202 of the suspension assembly 100 and 200, respectively, can have surfaces that are abrasive and can scratch against other components, e.g., the spring 104 and 204 and/or the load beam 106 and 206, and/or other parts of a hard disk drive, e.g., load-unload ramps and/or assembly combs, as are known to an individual having ordinary skill in the art, and result in the generation of debris, which can detrimentally affect the operation of the hard drive. These abrasive surfaces, which typically are made from stainless steel, are deburred in a vibratory manner resulting in the generation of additional debris. As magnetic recording technologies advance, they have become increasingly sensitive to smaller size debris. Accordingly, there is a need for suspension assembly baseplates with nonabrasive surfaces. The present invention satisfies these needs.

SUMMARY

The present invention resides in a baseplate having a coined surface that is configured to be included in a hard disk drive suspension assembly, a hard disk drive suspension assembly that includes the baseplate, and a related method for manufacturing the baseplate. An exemplary method according to the invention is a method for manufacturing a baseplate having a surface wherein the baseplate is configured to be included in a hard disk drive suspension assembly. The method includes forming the baseplate in a manner that can create a roughness in a portion of the surface, and coining the surface of the baseplate to reduce the roughness in the portion of the surface.

In other, more detailed features of the invention, the portion of the surface is a die break edge or a die roll edge. Also, the hard disk drive suspension assembly can be configured to be included in a hard disk drive, and the reduction of the roughness in the portion of the surface can result in a reduction in an amount of debris in the hard disk drive. In addition, the hard disk drive suspension assembly can be configured to include a spring, the step of forming the baseplate can include forming an integral anvil in the baseplate, and the integral anvil can be configured to provide an edge for forming a permanent bend in the spring.

In other more detailed features of the invention, the baseplate can have a shape, the baseplate can be made from a sheet of material, e.g., stainless steel, a composite of stainless steel, or a laminate material, and the step of forming the baseplate can include cutting the shape of the baseplate into the sheet of material using a stamp or a die. Also, a station having an insert can be used to coin the surface of the baseplate, and the step of coining the surface of the baseplate can include positioning the surface adjacent to the insert, and using the station to apply a force to the baseplate so the surface contacts and pushes against the insert. In addition, the surface of the baseplate can have a first contour before the surface is coined, the insert can have a second contour, and the force that is applied by the station on the baseplate can cause the first contour of the surface of the baseplate to conform to the second contour of the insert.

An exemplary embodiment of the present invention is a baseplate that is configured to be included in a hard disk drive suspension assembly. The baseplate includes a surface that has been coined to reduce any roughness that might have existed in a portion of the surface before the surface was coined.

In other, more detailed features of the invention, the hard disk drive suspension assembly also is configured to include a spring, and the baseplate includes an integral anvil that is configured to provide an edge for forming a permanent bend in the spring. Also, the edge for forming the permanent bend in the spring can be included in the surface that has been coined.

Another exemplary embodiment of the present invention is a suspension assembly that is configured to be included in a hard disk drive. The suspension assembly includes a baseplate that includes a surface that has been coined. The surface of the baseplate was coined to reduce any roughness that might have existed in a portion of the surface before the surface was coined.

Related systems, methods, features and advantages of the invention or combinations of the foregoing will be or will become apparent to one having ordinary skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

Preferred embodiments of the invention will hereinafter be described in conjunction with the appended drawings provided to illustrate and not to limit the invention. The components in the figures are not necessarily to scale, emphasis instead being placed upon illustrating the principles of the invention. In the figures, like reference numerals designate corresponding parts throughout the different views.

DETAILED DESCRIPTION

In accordance with the foregoing objectives of the invention, preferred embodiments are now described in further detail, which, when read in conjunction with the claims and drawings, give broader meaning and scope to the spirit of the invention.

As utilized herein, terms such as "about" and "substantially" and "approximately" are intended to allow some leeway in mathematical exactness to account for tolerances that are acceptable in the trade, or that would otherwise encompass a functionally equivalent variation. Accordingly, any deviations upward or downward from any value modified by such terms should be considered to be explicitly within the scope of the stated value.

The present invention discloses an improvement in the design of disk drive suspension assemblies. Specifically, the improvement is directed to providing tooling features integral to the suspension system to aid in forming suspension system components. In various embodiments disclosed herein, the tooling feature comprises an anvil integrally formed on a suspension system baseplate. The integral anvil greatly simplifies the process of pre-load forming, or pre-loading, the suspension assembly to counteract the lift force transmitted by the slider. In other embodiments, the improvement is directed to coining surfaces of the formed suspension system components.

Figure 1:
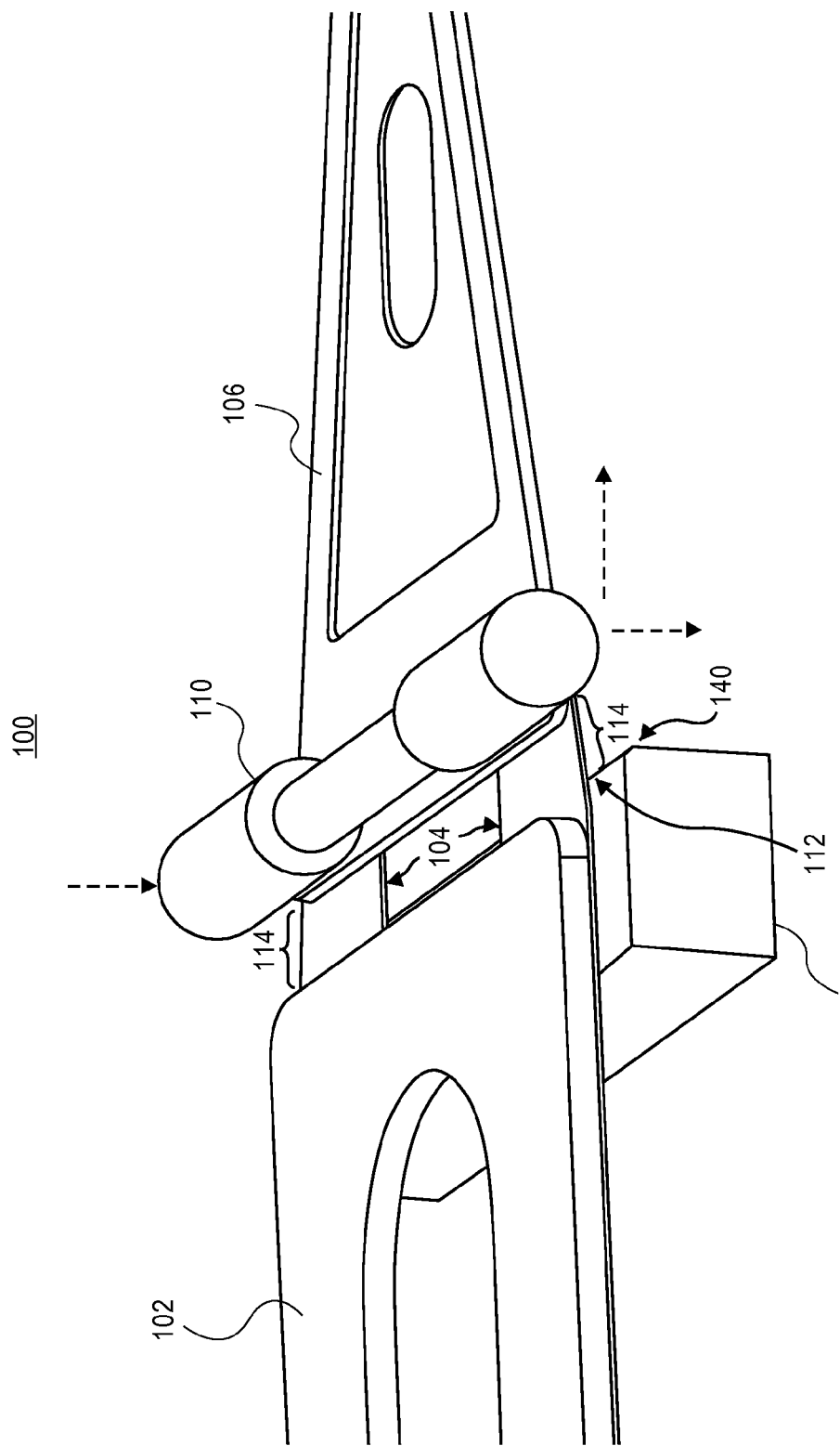
FIG. 1 illustrates a prior art suspension assembly having a spring bonded to the bottom surfaces of a baseplate and load beam, and a tooling anvil and roller used to form a bend in the spring.
Figure 2:
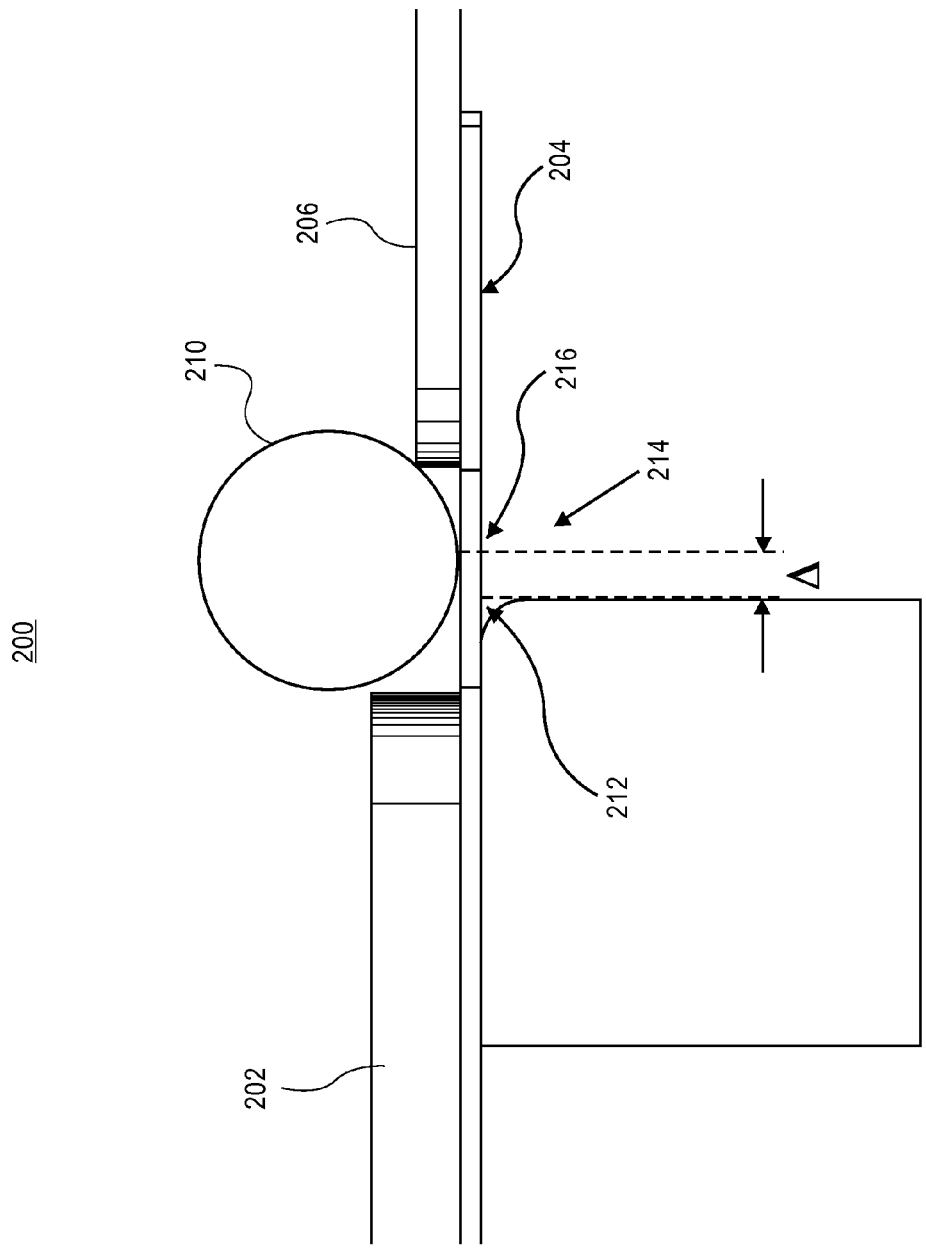
FIG. 2 shows a side view of a prior art suspension assembly having a short spring length between baseplate and load beam.
Figure 3:
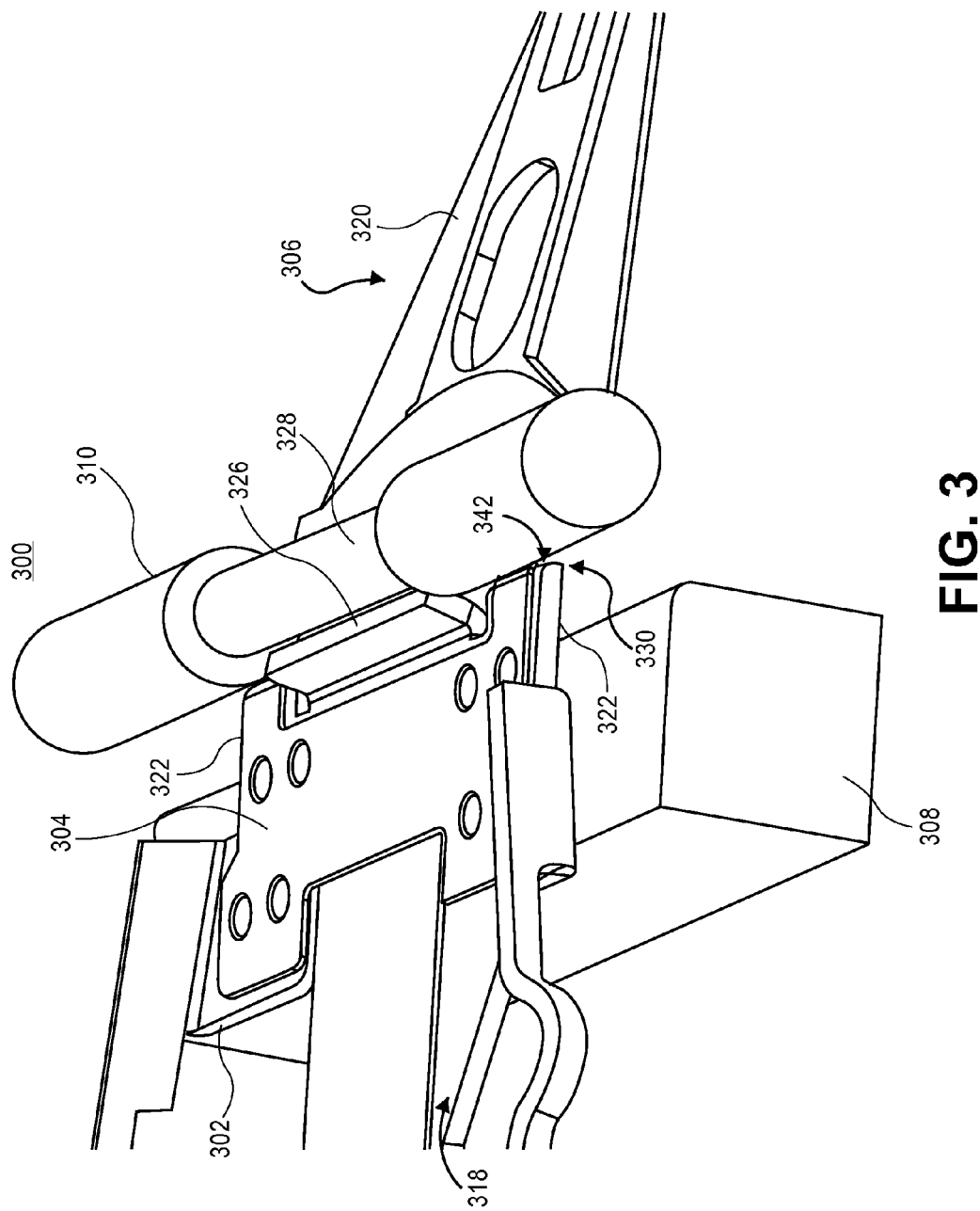
FIG. 3 illustrates one embodiment of a suspension assembly according to the invention configured with integral anvils for pre-load forming, shown with tooling anvil and roller.

FIG. 3 shows a top isometric view of one embodiment of a suspension assembly 300 according to the present invention. The proximal end of the assembly is shown on the left-hand side of the page, and the distal end of the assembly is shown on the right-hand side of the page. Assembly 300 comprises a baseplate 302 coupled to a load beam 306 through a spring (or spring portion) 304. In the embodiment shown, spring 304 is a separate component that is bonded to an upper surface 318 of baseplate 302 at a distal end of baseplate 302. The opposite end of spring 304 is bonded to an upper surface 320 of load beam 306 at a proximal end of load beam 306. In other embodiments, spring 304 may be formed as an integral part of load beam 306. The bonds between spring 304 and the upper surfaces 318 and 320 may be effected by any conventional means; for example, by welding or by use of epoxy glue.

Baseplate 302 is configured with one or more integral anvils 322 for pre-load forming of spring 304. As shown in the figure, each integral anvil 322 in this embodiment comprises a tab extending from baseplate 302 to a position between the distal end of baseplate 302 and the proximal end of load beam 306. Each integral anvil is configured at its distal end with a rounded corner 342 at the top of a spring-forming edge 330. At the spring-forming edge 330 of each integral anvil 322, spring 304 bends downward about rounded corner 342, thereby coupling load beam 306 at an angle with respect to the upper surface of baseplate 302. Baseplate 302, spring 304, and load beam 306 are each composed of a metal, typically a stainless steel alloy of substantially uniform thickness. Baseplate 302 has a thickness several times that of spring 304 in order to provide effective anchorage during forming or flexing of the spring.

Forming tools are also shown in the figure in their approximate locations when preloading spring 304. A tooling anvil 308 abuts a bottom surface of baseplate 302, and a roller tool 310 is positioned above the assembly approximately directly above an optimal, or desired, bend location on spring 304. These tools are not components of assembly 300. They are shown to illustrate their cooperation with integral anvils 322 when forming springs 304. Skilled artisans will appreciate that cooperation of assembly 300 with forming tools 308 and 310 requires assembly 300 to possess certain interfacing features to ensure dimensional compatibility. One example of an interfacing feature is the shape of the bottom surface of baseplate 302. In the embodiment shown, the flat configuration of the bottom surface of baseplate 302 allows baseplate 302 to firmly abut the top surface of tooling anvil 308. This helps to ensure stable positioning of assembly 300 on tooling anvil 308, and also ensures an even distribution of load across the upper surface of tooling anvil 308 when roller 310 presses downward to form a permanent bend in spring 304. Surface interface configurations other than flat are certainly possible within the scope of the invention. Another example of an interfacing feature comprises placement of the spring-forming edge 330 of one or more integral anvils 322 at a location such that the impact point of a roller 310 may coincide with spring-forming edge 330, free of interference from other suspension assembly features or components. Another example of an interfacing feature is a height restriction on limiter 326 that provides sufficient clearance for the central recessed portion 328 of roller 310 to allow unobstructed movement of roller 310 across the surface of spring 304.

Figure 4:
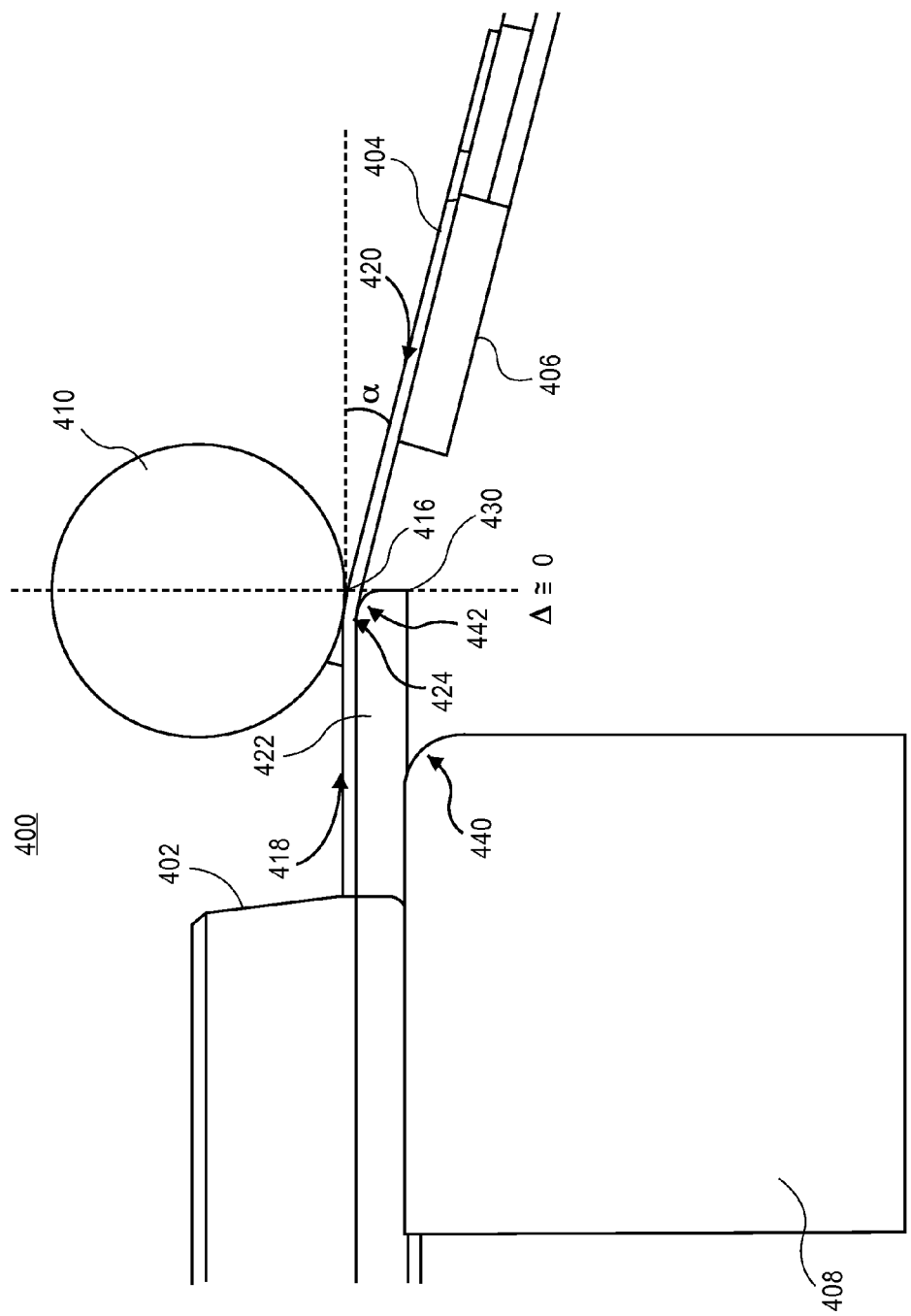
FIG. 4 shows a side view of an embodiment of the invention during pre-load forming.

FIG. 4 shows a side view of an embodiment of the invention during pre-load forming. Note that placement of spring 404 between roller 410 and assembly surfaces (in this case, upper surfaces 418 and 420) advantageously eliminates any mechanical interference of those surfaces with roller 410. In other words, by locating the baseplate and load beam steps on a surface of spring 404 opposite roller 410, roller 410 may be freely positioned along a surface of spring 404 until impact point 416 substantially coincides with an optimal bend location 424. This ability to freely position roller 410 allows the horizontal offset A to be reduced to approximately zero.

The configuration shown in FIG. 4 allows spring 404 to be bent with minimal error at optimal bend location 424 as roller 410 presses downward on spring 404 forcing it around corner 442 of integral anvil 422, while tooling anvil 408 abuts baseplate 402 to provide stability for assembly 400 during the bending operation. The resulting bend angle radius of spring 404 is influenced by curvature in corner 442, just as it would be influenced by the radius of curvature of corner 440 using prior art methods. However, it is worth noting that the curvature of corner 442 and the resulting bend angle radius in spring 404 are typically unequal. This is due to a springback effect (or resiliency) in spring 404, as well as the effect of roller stroke. Although artisans refer to the resulting bend as a "radius", note that the bend angle in spring 404 may not always be circular; but may resemble various non-circular forms of curvature such as elliptic, hyperbolic, or parabolic curves. The curvature of corner 442 may also comprise a circular or non-circular arc. In spring 404, the resulting bend angle radius (whether circular or non-circular), its uniformity, and its consistency from spring to spring, contribute significantly to suspension assembly performance. Controlling curvature of bending corner 442 is therefore an important aspect of quality control.

By controlling parameters such as bending corner curvature, roller force, roller travel, component material compositions and thicknesses, a suspension assembly according to the invention may be pre-loaded to a desired value by creating a permanent bend in spring 404. Thus, after removal of the tooling components, and with assembly 400 in an unloaded condition, spring 404 couples load beam 406 at a desired angle $\alpha$ with respect to baseplate 402.

Another advantage realized by configuring a baseplate 402 with at least one integral anvil 422 is that precision placement of a tooling anvil 408 is no longer required to ensure bending of spring 404 at optimal bend location 424. In an embodiment according to the invention, the bend location is determined according to the placement and formation of spring-forming edge 430 of integral anvil 422. Bend location accuracy is therefore controllable by the baseplate forming and/or etching processes used to configure the integral anvil. The role of tooling anvil 408 is thus reduced to providing a stable mounting surface for baseplate 402, and this allows for a much wider tolerance on placement of the tooling anvil.

Another advantage is that out-of-tolerance conditions in bend angle radius are far less likely, because each integral anvil is used only once in a bending operation. As a result, changes in the corner curvature of a tooling anvil are no longer an issue in quality control.

Figure 5:
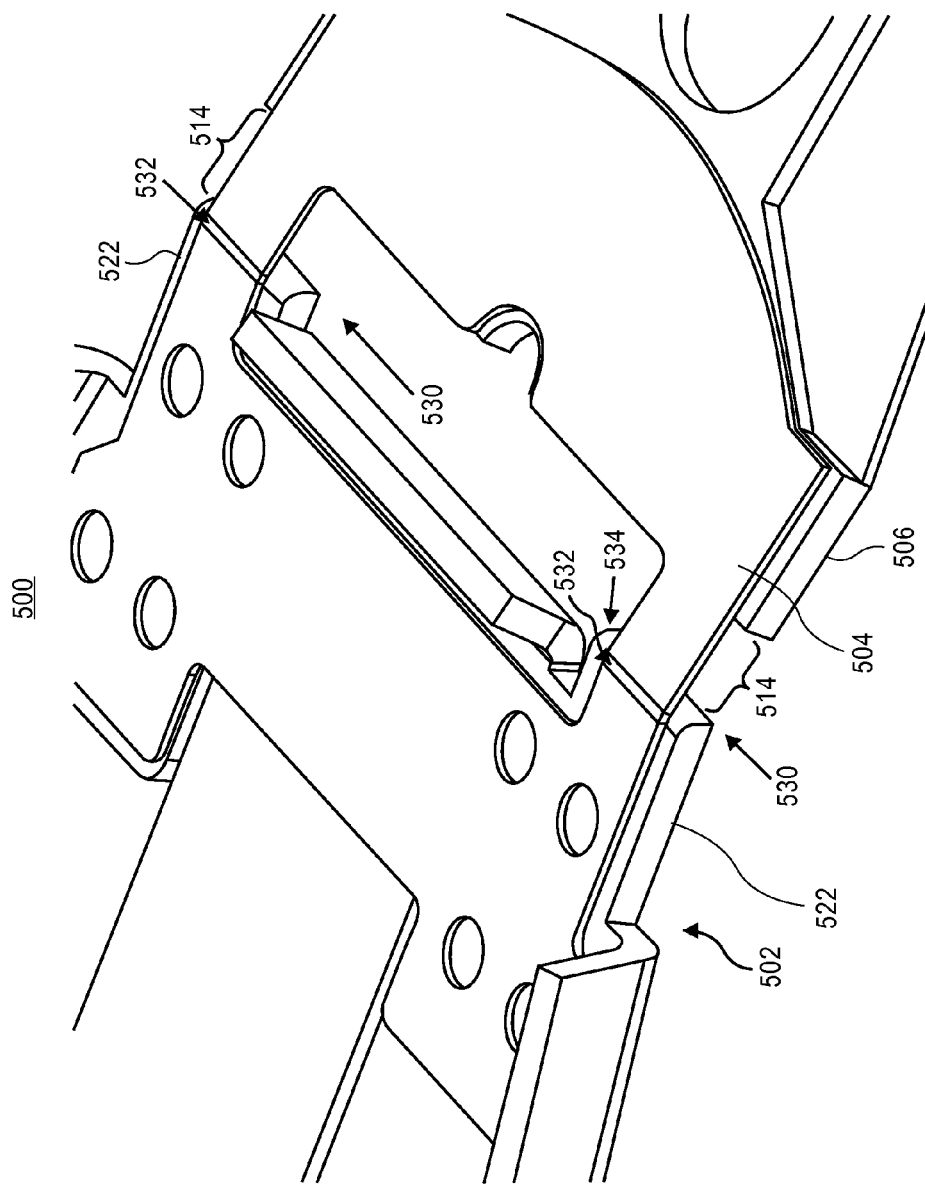
FIG. 5 shows a magnified isometric view of an embodiment of a baseplate according to the invention assembled to a spring and load beam.

FIG. 5 shows a magnified isometric view of an embodiment 500 of a baseplate 502 according to the invention assembled to a spring 504 and a load beam 506. Assembly 500 includes integral anvils 522, one on each side of baseplate 502, corresponding to bridging areas 514 of spring 504. Integral anvils 522 are formed for alignment of their spring-forming edges 530 coincident with the optimal bend location 532, when spring 504 is bonded to baseplate 502 in a desired location. In this embodiment, the upper corners of integral anvils 522 comprise rounded corners 534. Rounded corners 534 may be employed to provide a smoother fulcrum for the bend in location 532 to reduce the probability of spring fatigue or fracture during pre-load forming. This also reduced the probability of spring failure at the bend location during an excessive load condition such as a shock.

In the embodiments presented thus far, the integral anvils have been shown having a uniform thickness—the same thickness of the baseplate from which the integral anvil is formed. Additional embodiments are now disclosed wherein a portion of an integral anvil is configured with less thickness than the uniform thickness to achieve an additional manufacturing advantage.

Figure 6:
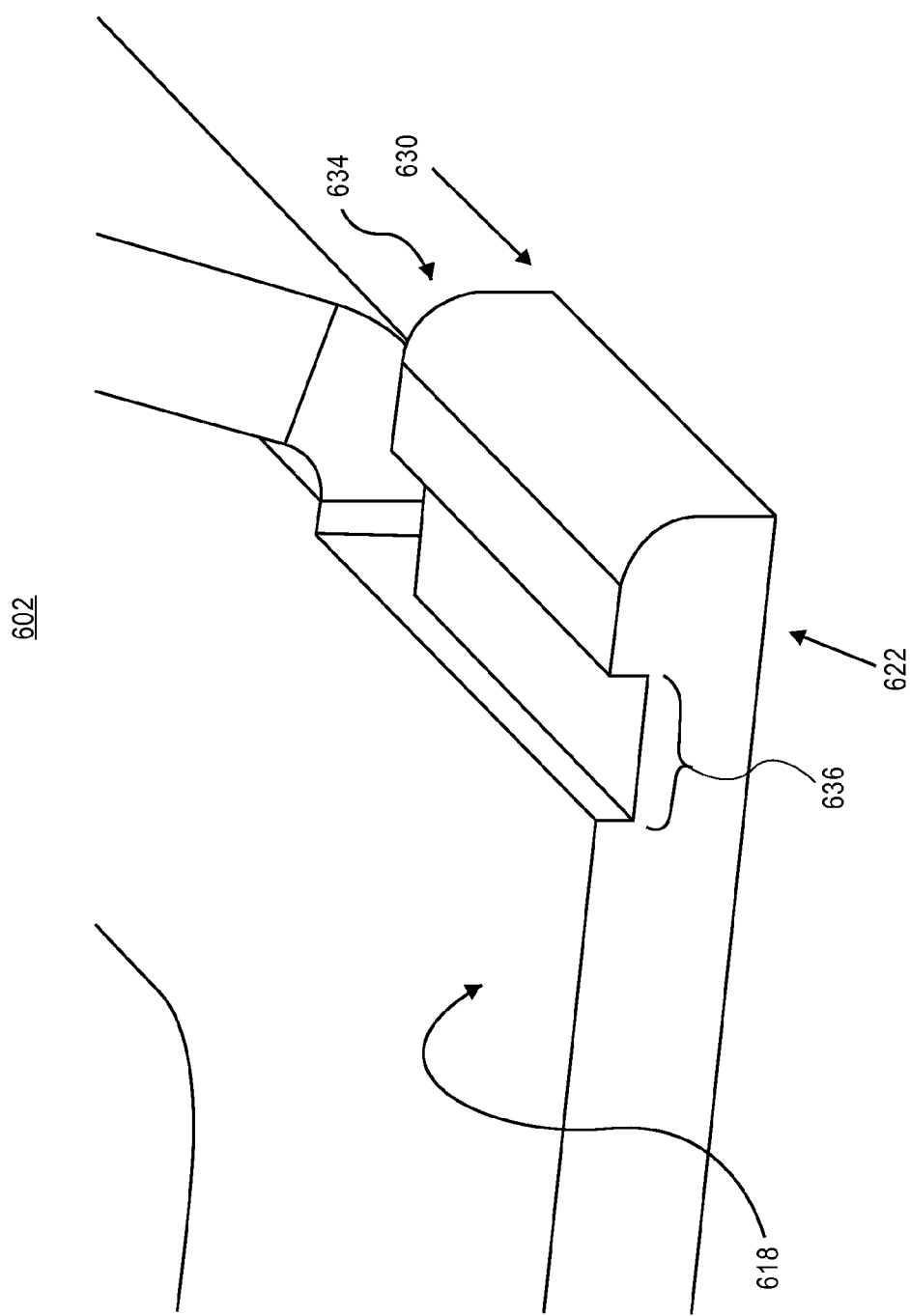
FIG. 6 is a magnified isometric view of one embodiment of the invention, showing a baseplate with integral anvil and a relief area channel.

FIG. 6 shows a magnified isometric view of an embodiment of the invention, showing a baseplate 602 configured with an integral anvil 622. In this embodiment, integral anvil 622 includes a relief area 636 comprising a rectangular channel running through the upper surface in a transverse direction parallel to spring-forming edge 630. Relief area 636 may be formed by etching or precision machining. The purpose of relief area 636 is twofold. First, it lessens the total frictional force that acts against a spring (not shown) under tension during a bending operation as the spring is stretched across upper surface 618 and around corner 634. Second, the elimination of friction beneath the portion of the spring covering relief area 636 allows that spring portion greater flexibility, thereby facilitating stretching and bending of the spring at a location adjacent to the optimal bend location when the spring is subject to rolling tool pressure. This creates greater uniformity in the thickness of the spring throughout the bend, resulting in a more resilient spring.

Figure 7:
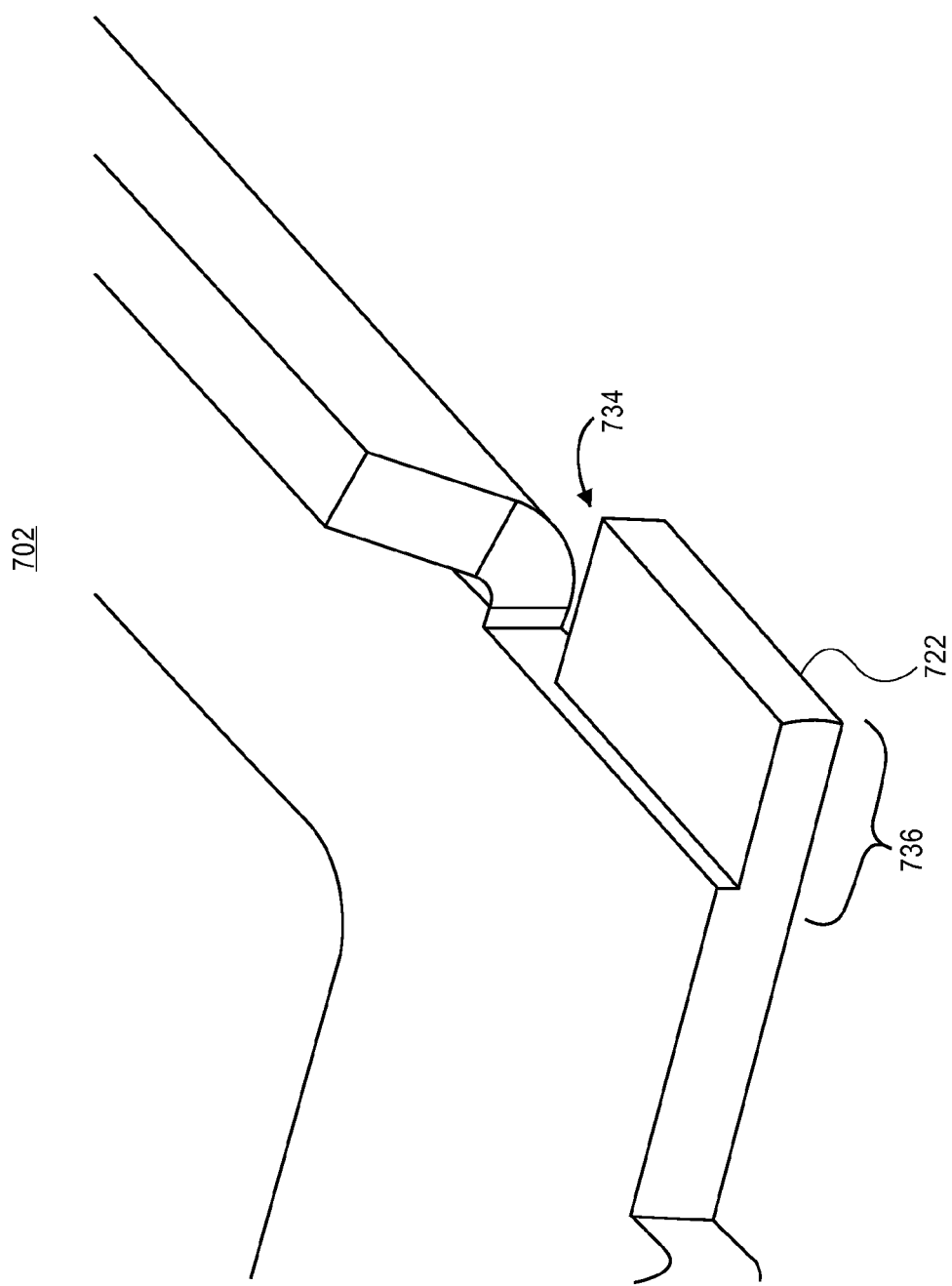
FIG. 7 is a magnified isometric view of another embodiment of a baseplate according to the invention, this one having a relief area etched over the entire upper surface of the integral anvil.

FIG. 7 shows a magnified isometric view of another embodiment of a baseplate 702 according to the invention, this one having a relief area 736 etched or machined over the entire upper surface of integral anvil 722 to reduce its overall thickness. In this embodiment, the only contact between integral anvil 722 and its corresponding spring occurs at the junction of corner 734 and the optimal bend location. Many other embodiments of a baseplate according to the invention are possible, wherein the baseplate includes some configuration of one or more relief areas that create a portion of the integral anvil having less thickness than the uniform thickness of the baseplate.

Figure 8:
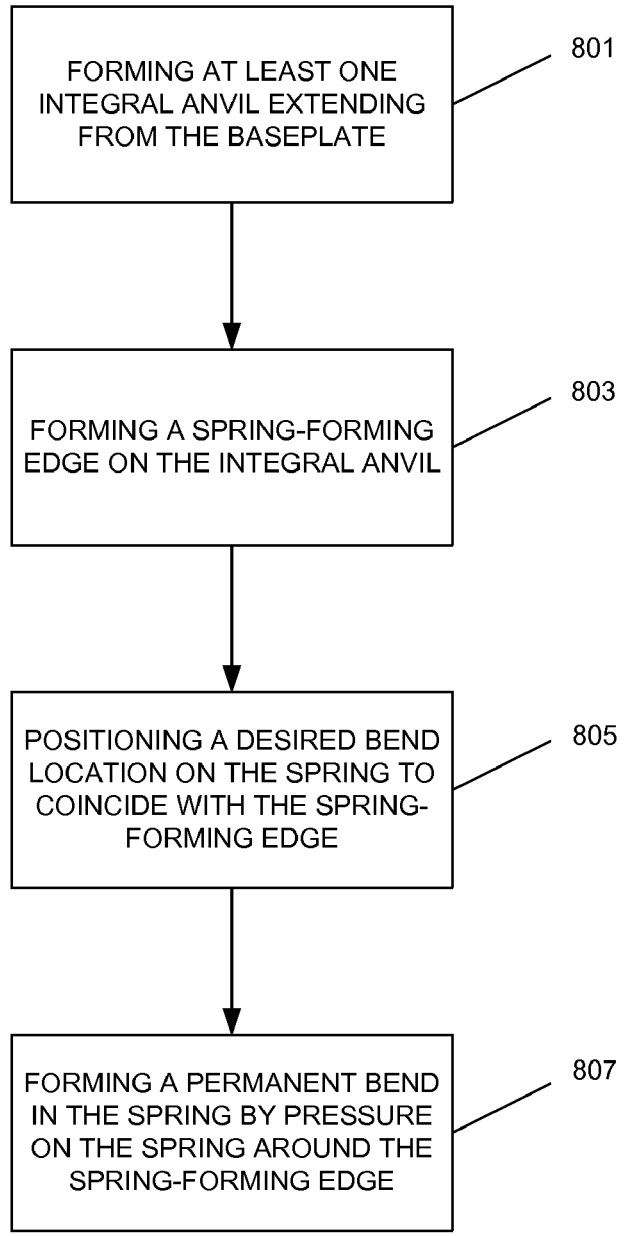
FIG. 8 illustrates a method according to the invention for pre-loading a hard disk drive suspension assembly.

FIG. 8 illustrates an embodiment of a method 800 according to the invention for pre-loading a hard disk drive suspension assembly. These method steps may be deduced from the foregoing disclosure, and are presented in flowchart form for greater clarity. Additional method steps or limitations not expressly included within the flow chart may be similarly deduced from the foregoing disclosure.

Method 800 begins at step 801, which comprises forming at least one integral anvil on a baseplate, such that the integral anvil extends in a longitudinal or distal direction toward the load beam end. Any appropriate forming technique may be used, such as stamping, cutting, and/or bending a baseplate from sheet metal using tooling such as a progressive forming die. In another implementation, step 801 may further comprise forming an integral anvil to position its distal edge at a location coincident with an optimal bend location on a spring, when the spring is attached to the baseplate a desired or predetermined location. The method then proceeds to step 803. This step comprises forming a spring-forming edge on the integral anvil. In one example, this forming step comprises creating a rounded corner on a spring-forming edge of the integral anvil.

The next step 805 comprises positioning a desired, or optimal bend location on a spring to coincide with the spring-forming edge. Implied in this step is bonding or otherwise attaching the spring to the baseplate at a predetermined or desired location, such that the optimal bend location on the spring lines up with the spring-forming edge of the integral anvil. In the final step 807, the suspension assembly is pre-loaded by forming a permanent bend in the spring by an appropriate tooling means. In one embodiment, this means comprises supporting the assembly by means of a tooling anvil, and applying pressure to the spring using a roller to bend the spring around the spring-forming edge of the integral anvil.

Figure 9:
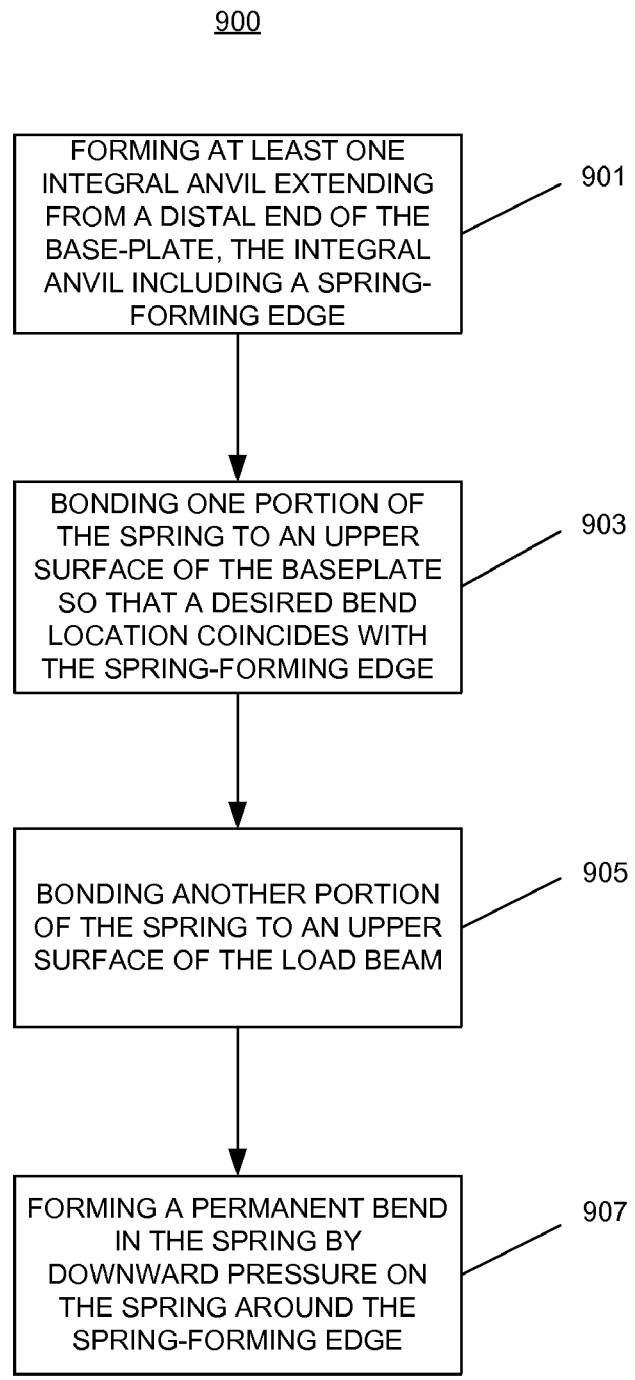
FIG. 9 illustrates a method according to the invention for manufacturing a baseplate for a hard disk drive suspension.

FIG. 9 illustrates an embodiment of a method 900 according to the invention for manufacturing a baseplate for a hard disk drive suspension. The steps of method 900 are presented in flowchart form for greater clarity. Additional method steps or limitations not expressly included within the flow chart may be deduced from the foregoing disclosure.

Method 900 begins at step 901, which comprises forming at least one integral anvil on a distal end of the baseplate, such that the integral anvil includes a spring-forming edge. Formation of the spring-forming edge may include any appropriate forming techniques such as cutting, shaping, stamping, or etching a baseplate, and may also include forming a rounded corner on the spring-forming edge. The next step 903 comprises bonding one portion of the spring to an upper surface of the baseplate so that a desired bend location coincides with the spring-forming edge. In another embodiment, a portion of the spring is bonded to a baseplate surface so that the spring lies between the baseplate and a roller contact point. In any of these embodiments, bonding may be effected by any means known in the art, e.g. by applying an adhesive, or by welding, riveting, fastening, etc. The next step 905 comprises bonding another portion of the spring to an upper surface of the load beam. In another embodiment, the other portion of the spring is bonded to a load beam surface so that both the baseplate and load beam lie substantially on a common side of the spring. The final step 907 comprises pre-loading the suspension assembly by forming a permanent bend in the spring by downward exerting pressure on the spring around the spring-forming edge.

Figure 10:
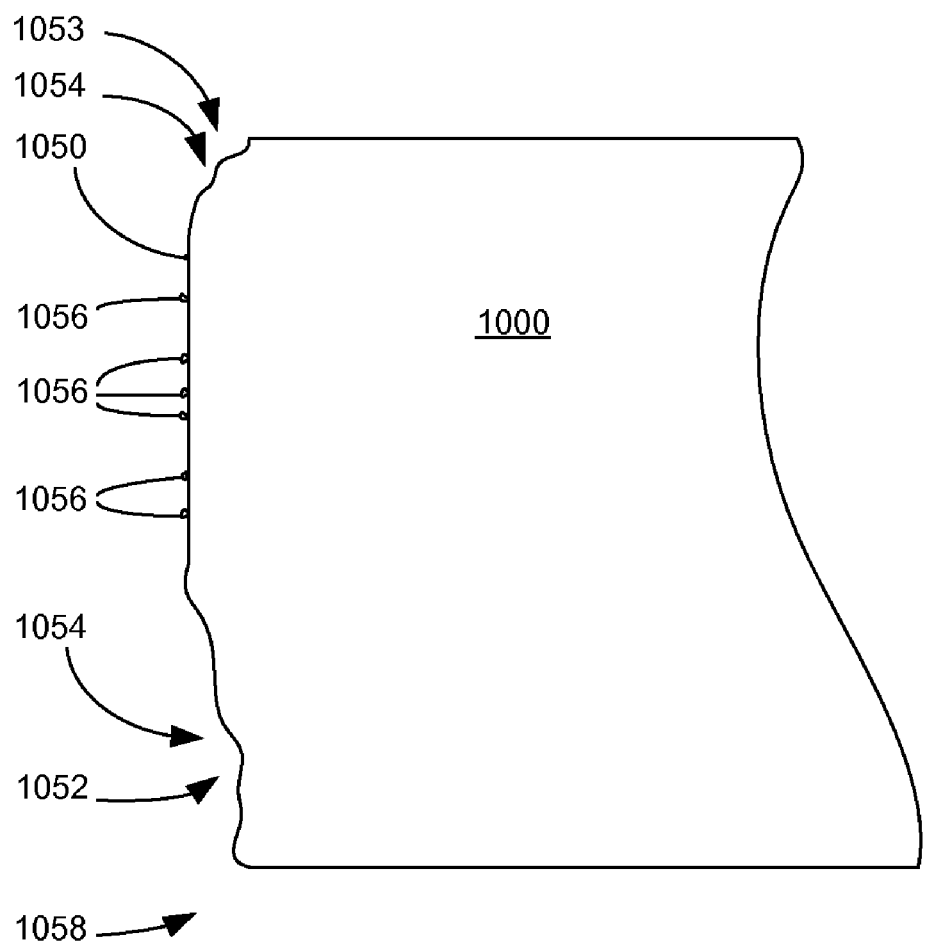
FIG. 10 shows a partial cross-sectional side view of a baseplate of a hard disk drive suspension assembly.

Referring again to FIGS. 3-7, and additionally to FIG. 10, which is a partial cross-sectional side view of a baseplate 1000 of a suspension assembly 300, 400, and 500, one problem that is associated with the formation of the various surfaces 1050 of the baseplate is that sharp and/or inconsistent die break edges 1052 and/or die roll edges 1053 can be created in the surfaces. These portions 1054 of the surface, e.g., the sharp and/or inconsistent die break edges and/or die roll edges, can be formed, for example, when the shape of the baseplate is cut from the sheet of material, e.g., stainless steel, a composite of Stainless steel, or a laminate material (see U.S. Pat. No. 6,572,984 to Brink, which is hereby incorporated by reference), or other material from which it is formed. The shape of the baseplate can be cut from the sheet of material using any of a variety of cutting device, e.g., a stamp or a die, which are known to individuals having ordinary skill in the art.

Rough portions 1054, e.g., sharp and/or inconsistent die break edges 1052 and/or die roll edges 1053, of the baseplate's surface 1050, are disadvantageous because they have a roughness that can contact and scratch any of the following: other components, e.g., a spring 304, 404, and 504, and/or a load beam 306, 406, and 506, that are included in the suspension assembly 300, 400, and 500, other components that are implemented during the fabrication process of the suspension assembly, and/or other components of the hard disk drive which includes the suspension assembly. This contact and scratching can result in the generation of debris 1056, e.g., particulate matter, which can cause the hard disk drive that includes the suspension assembly to fail. As a result, most manufacturers inspect the surfaces of the suspension assembly components before installation of the suspension assembly into a hard disk drive. Sharp and/or inconsistent die break edges and/or die roll edges can be deburred using deburring processes, which are known to individuals having ordinary skill in the art, for example, soaking the baseplate for a period of time in an electrochemical deburring tank. However, vibratory, chemical, or electrochemical deburring of the die break edges and/or the die roll edges affects all of the baseplate surfaces, thus degrading other critical tolerances and edges required for other purposes.

Figure 11:
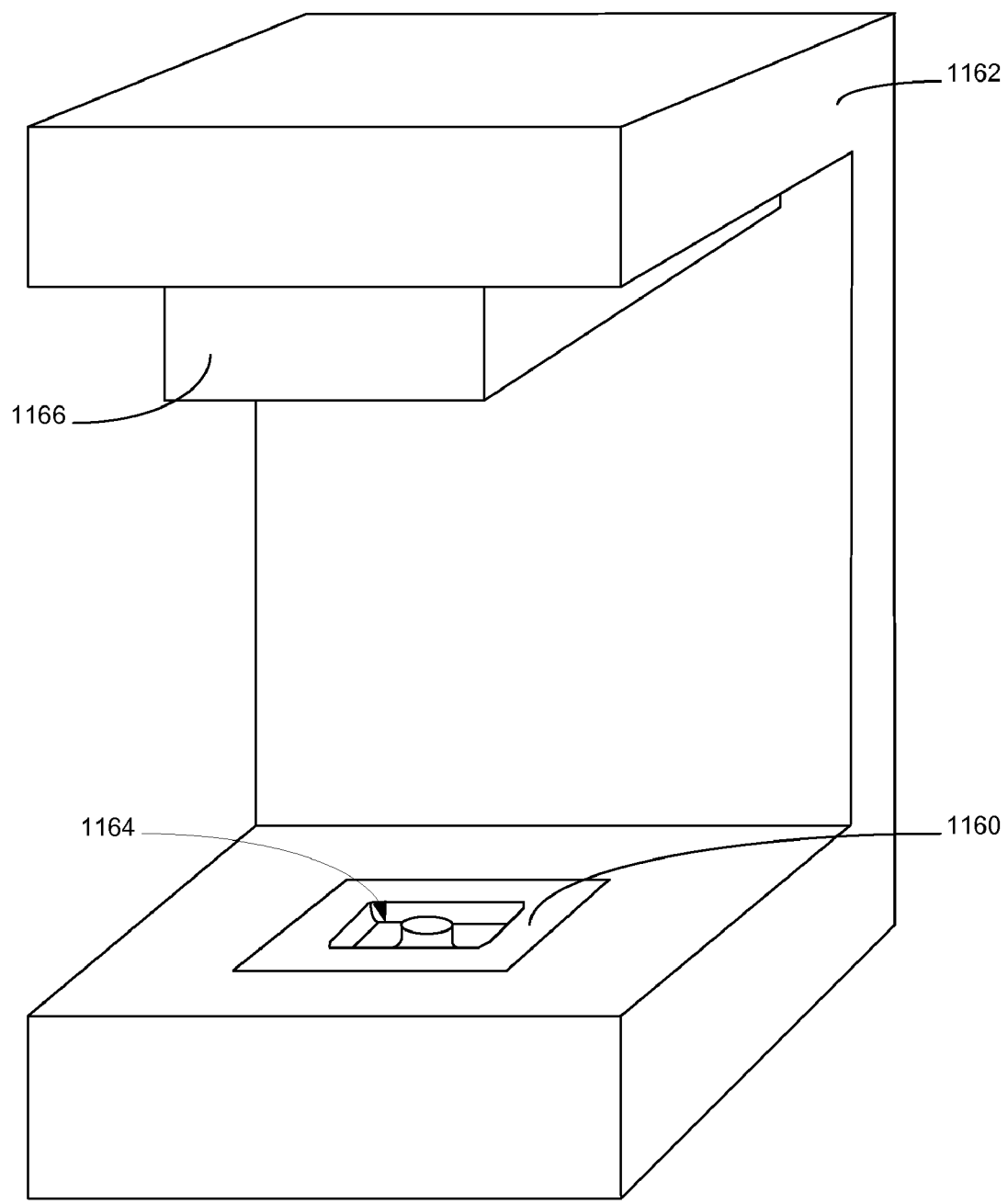
FIG. 11 shows a perspective view of a station having an insert that is used for coining a baseplate of a hard disk drive suspension assembly.

A method for eliminating or reducing the effect of the rough portions 1054, e.g., sharp and/or inconsistent die break edges 1052 and/or the die roll edges 1053, of a baseplate's surfaces 1050 is to coin, i.e., to shape, the baseplate's surfaces 1050 after the baseplate is cut. Referring additionally to the perspective view shown in FIG. 11, a baseplate 1000 is coined by placing the baseplate in an insert 1160 that is included in a device 1162 referred to as a station. The insert has a contour 1164 that matches the desired contour of the baseplate.

Using the station 1162, an operator can apply a force to the baseplate 1000 via a top part 1166 that is configured to press down onto the baseplate and cause the baseplate's surfaces 1050 that are adjacent to the insert 1160 to contact and push against the insert so the contour 1058 of the baseplate surface conforms to the contour 1164 of the insert, even if the initial contour of the baseplate surface differs from the insert's contour. Thus, the insert creates the final dimensions of the baseplate. As part of the coining process, the rough portions 1054 of the baseplate's surface 1050 can be reduced or eliminated. The coining process can be applied to any of the baseplate surfaces, even including the surface of an integral anvil 322, 422, 522, 622, and 722 having an edge 330, 430, 530, and 630 for forming the permanent bend in the suspension assembly's spring 304, 404, and 504. After the coining process, the baseplate 1000 is removed from the insert 1160 and station 1162, and moved to the next processing step.

Figure 12:
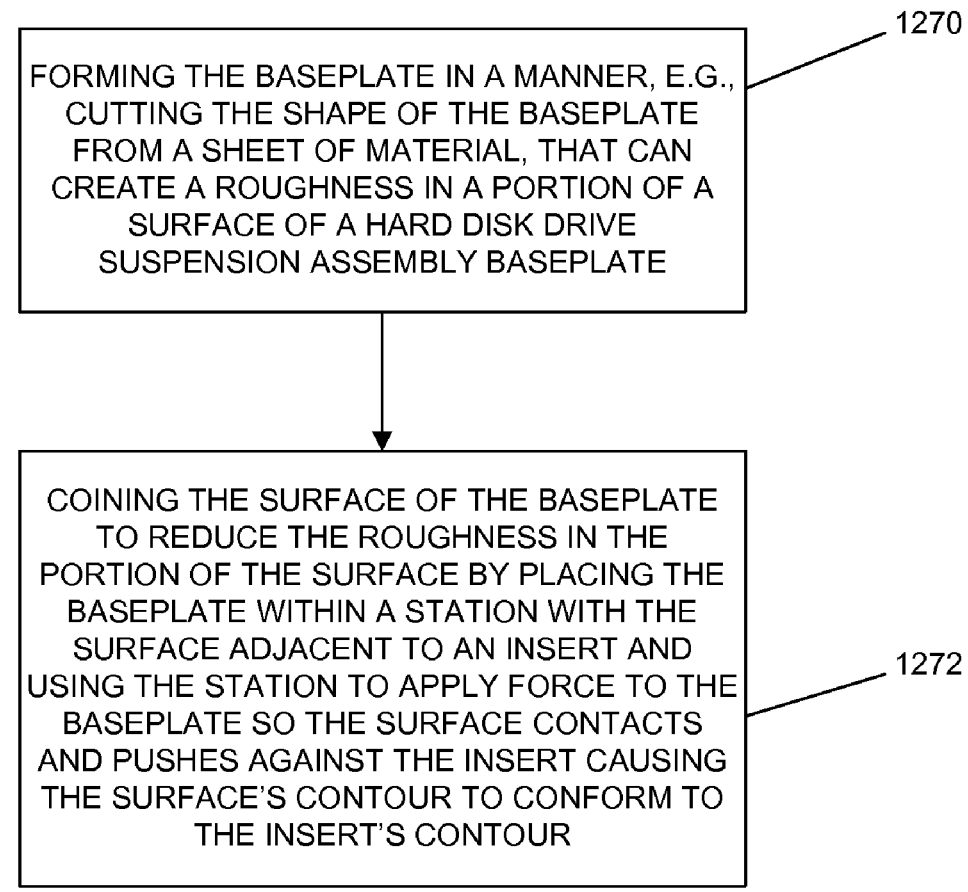
FIG. 12 illustrates a method according to the invention for manufacturing a baseplate of a hard disk drive suspension assembly.

FIG. 12 includes a flowchart 1200 that shows an example algorithm for manufacturing a baseplate 1000 that is to be included within a hard disk drive suspension assembly 300, 400, and 500. The baseplate has a surface 1050. The algorithm starts at step 1270 where the baseplate is formed in manner that can create a roughness in a portion 1054 of the baseplate's surface. The baseplate can be formed, for example, by cutting the shape of the baseplate from a sheet of material, e.g., stainless steel, a composite of stainless steel, or a laminate material. Next, at step 1272, the surface of the baseplate is coined to reduce the roughness in the portion of the surface. The baseplate is placed in a station 1162 with the baseplate surface adjacent to an insert 1160 that is part of the station, and then, the station is used to apply force to the baseplate so the baseplate surface contacts and pushes against the insert causing the surface's contour 1058 to conform to the insert's contour 1164.

Figure 13:
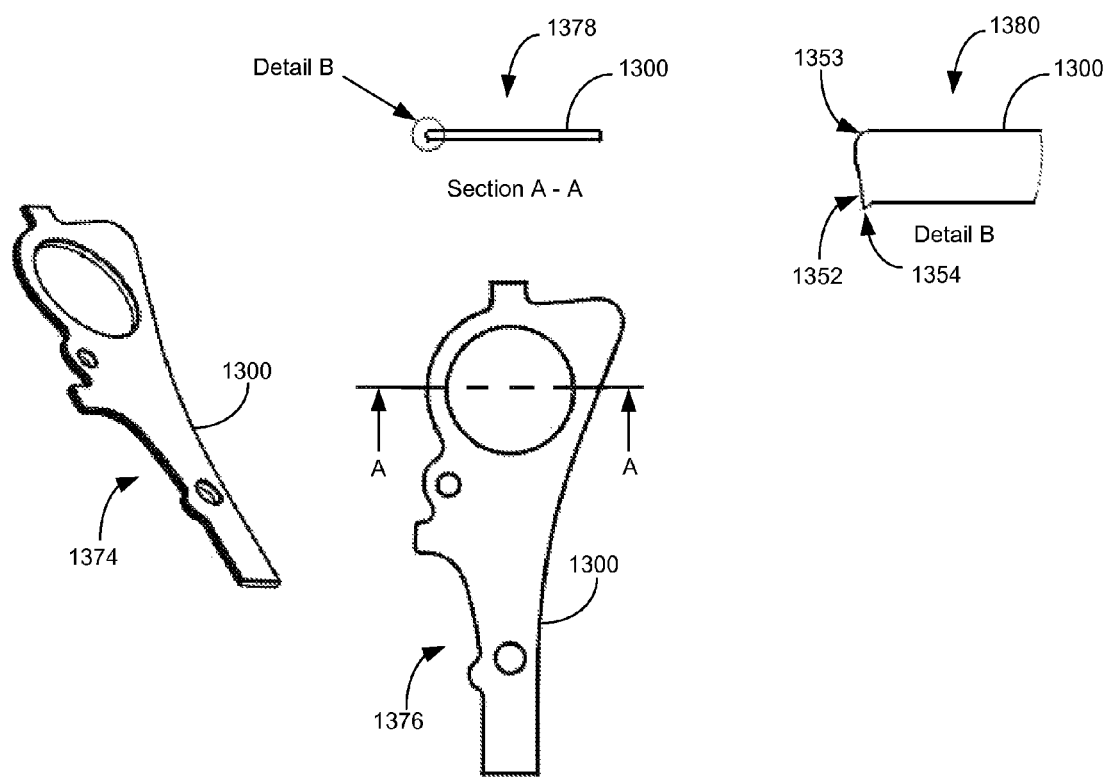
FIG. 13 shows a perspective view, a top plan view, a cross-section side view, and a magnified partial cross-sectional side view of a baseplate of a hard disk drive suspension assembly before coining.

FIG. 13 shows various views of another example baseplate 1300 before the baseplate is coined. More specifically, FIG. 13 includes a perspective view 1374, a top plan view 1376, and a cross-sectional side view along line A-A 1378 of the baseplate. Also, FIG. 13 includes a magnified partial cross-sectional side view 1380 of the baseplate (see Detail B), which shows one of the baseplate's die break edges 1352 and die roll edges 1353, and associated roughness 1354 in the baseplate's surface before coining.

Figure 14:
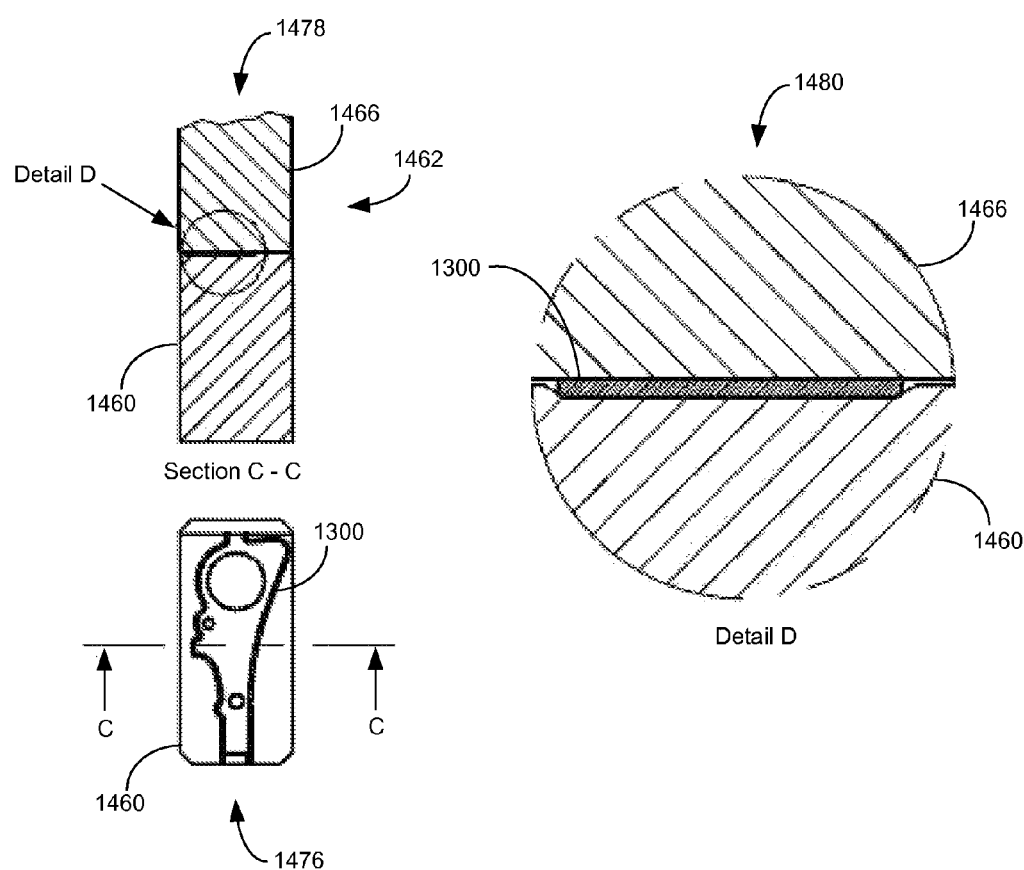
FIG. 14 shows a top plan view, a cross-sectional side view, and a magnified partial cross-sectional side view of the baseplate of FIG. 13 and an insert that is included in a station.

Referring additionally to FIG. 14, the example baseplate 1300 from FIG. 13 is shown resting in an insert 1460 that is included in a station 1462 during the coining process. In particular, FIG. 14 includes a top plan view 1476 of the baseplate within the insert, and a corresponding cross-sectional side view 1478 of the baseplate, the insert, and the station's top part 1466 along line C-C. FIG. 14 also includes a magnified partial cross-sectional side view 1480 of the baseplate, insert, and top part (see Detail D), which shows the top part pressing down on the baseplate within the insert.

Figure 15:
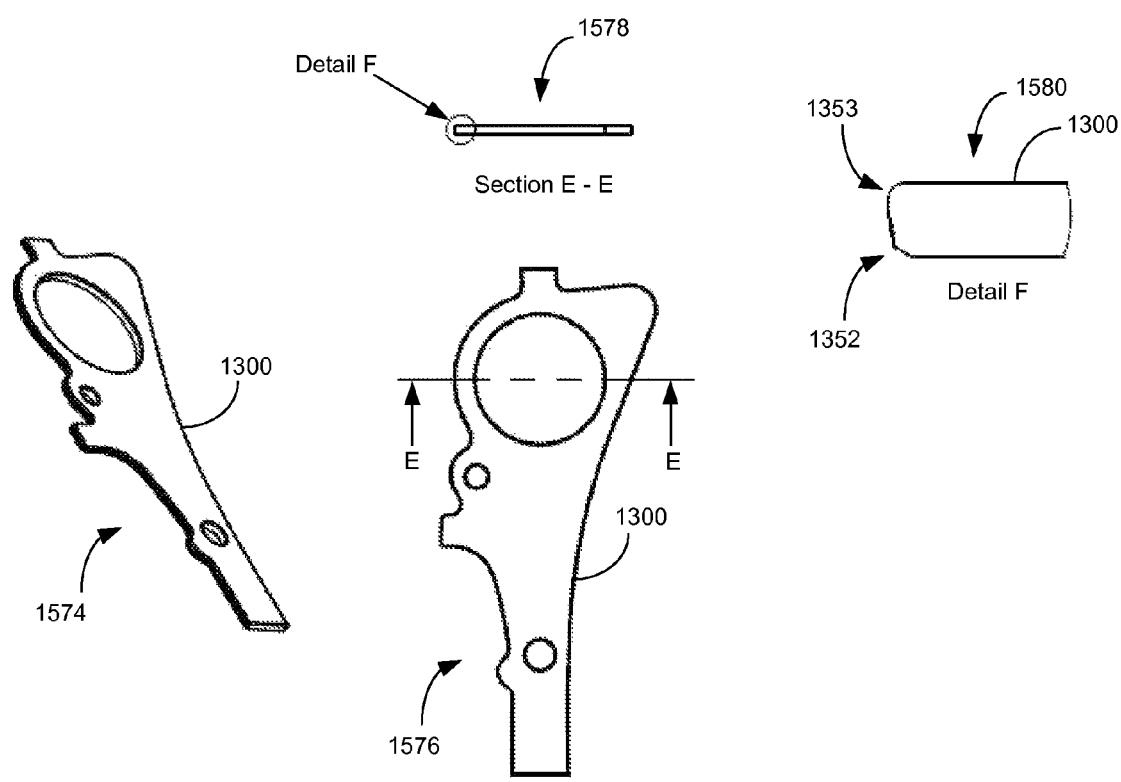
FIG. 15 shows a perspective view, a top plan view, a cross-section side view, and a magnified partial cross-sectional side view of the baseplate of FIGS. 13 and 14 after coining.

Referring additionally to FIG. 15, the example baseplate 1300 from FIGS. 13 and 14 is shown after the coining process is complete. FIG. 15 includes a perspective view 1574, a top plan view 1576, a cross-sectional side view along line E-E 1578, and a magnified partial cross-sectional side view 1580 of the coined baseplate (see Detail F). As shown in the magnified view, the roughness 1354 previously associated with the die break edge 1352 has been reduced as a result of the coining process.

Advantageously, by adding the processing step of coining the baseplate 1000 and 1300 of the hard disk drive suspension assembly 300, 400, and 500, any roughness in one or more portions 1054, e.g., sharp and/or inconsistent die break edges 1052 and 1352 and/or die roll edges 1053 and 1353, of the baseplate's surface 1050 can be reduced and potentially eliminated. Thus, coined baseplates will have more consistently formed surfaces. Also, by coining the baseplates, the need for deburring a baseplate's surfaces can be eliminated, or the length of time spent deburring the baseplate's surfaces can be reduced. Accordingly, the step of coining the baseplates can result in increased product throughput, yield, and quality during manufacturing. Because the surfaces of the baseplate after coining are smoother in shape and more consistent formed, there is less of a likelihood that the surfaces will scratch other components, e.g., a spring 304, 404, and 504, a load beam 306, 406, and 506, load-unload ramps, and/or assembly combs, as are known to an individual having ordinary skill in the art, and create debris 1056. Accordingly, coining the baseplate surfaces results in a reduction in the roughness of the baseplate's surfaces and a reduction in the amount of debris that ultimately reside within the disk drive that includes the coined baseplate.

While various embodiments of the invention have been illustrated and described, it will be apparent to those of ordinary skill in the art that many more embodiments and implementations are possible that are within the spirit and scope of this invention. Accordingly, the invention is not to be restricted except in light of the attached claims and their equivalents.

What is claimed is:

1. A method for manufacturing a suspension, the suspension having a baseplate disposed at a first and proximal end of the suspension, a spring affixed to the baseplate at a first end of the spring, a load beam affixed to the spring at a second end of the spring opposite the first end thereof, and a read/write head mounted to the load beam the read/write head being disposed at a second and distal end of the suspension opposite the first and proximal end of the suspension at which the baseplate is disposed, the method comprising:
 a. forming the baseplate in a manner that can create a roughness in a portion of a surface of the baseplate; and
 b. coining the surface of the baseplate to reduce the roughness in the portion of the surface.

2. The method according to claim 1, wherein the portion of the surface is a die break edge or a die roll edge.

3. The method according to claim 1, wherein:
 a. the hard disk drive suspension assembly is configured to be included in a hard disk drive; and
 b. the reduction of the roughness in the portion of the surface results in a reduction in an amount of debris in the hard disk drive.

4. The method according to claim 1, wherein:
 a. the step of forming the baseplate includes forming an integral anvil in the baseplate; and b. the integral anvil is configured to provide an edge for forming a permanent bend in the spring.

5. The method of claim 4 wherein the integral anvil includes the coined surface of the baseplate, and wherein the method further comprising pressing the spring against the integral anvil to form a permanent bend in the spring.

6. The method according to claim 1, wherein:
a. the baseplate has a shape;
b. the baseplate is made from a sheet of material selected from the group consisting of stainless steel, a composite of stainless steel, and a laminate material; and
c. the step of forming the baseplate includes cutting the shape of the baseplate into the sheet of material using a device selected from the group consisting of a stamp and a die.

7. The method according to claim 1, wherein the step of coining the surface of the baseplate includes:
   i. positioning the surface adjacent to the insert, and
   ii. using a station and an insert to apply a force to the baseplate so the surface contacts and pushes against the insert.

8. The method according to claim 7, wherein:
a. the surface of the baseplate has a first contour before the surface is coined;
b. the insert has a second contour; and
c. the force that is applied by the station on the baseplate causes the first contour of the surface of the baseplate to conform to the second contour of the insert.

9. The method of claim 1 further comprising pressing the spring against the coined baseplate surface to form a permanent bend in the spring.

10. A method for manufacturing a suspension, the suspension having a baseplate and a spring, the method comprising:
a. coining a surface of the baseplate to reduce roughness of the surface, the surface thereby defining a coined baseplate surface; then
b. pressing the spring against the coined baseplate surface to form a permanent bend in the spring.

11. The method of claim 10 wherein the coined baseplate surface defines part of an integral anvil.

12. The method of claim 10 further comprising, before the coining, forming the baseplate using a device selected from the group consisting of a stamp and a die.

13. The method of claim 10 wherein the coined baseplate surface comprises a rounded corner, and the spring is pressed against the rounded corner to form the permanent bend in the spring.

14. The method of claim 11 wherein the integral anvil has a reduced thickness compared to other portions of the baseplate.

15. The method of claim 10 further comprises assembling the suspension into a disk drive without further deburring the coined baseplate surface.

* * * * *